(12) United States Patent
Krolak et al.

(10) Patent No.: US 7,487,267 B2
(45) Date of Patent: Feb. 3, 2009

(54) METHOD AND APPARATUS FOR MANAGING DEPENDENCIES BETWEEN SPLIT TRANSACTION QUEUES

(75) Inventors: David John Krolak, Rochester, MN (US); Dorothy Marie Thelen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/347,416

(22) Filed: Feb. 3, 2006

(65) Prior Publication Data

US 2007/0198751 A1 Aug. 23, 2007

(51) Int. Cl.
*G06F 3/00* (2006.01)
(52) U.S. Cl. .................................. 710/29; 710/216
(58) Field of Classification Search ............ 710/29, 710/39, 45
See application file for complete search history.

(56) References Cited

U.S. PATENT DOCUMENTS

| | | | | |
|---|---|---|---|---|
| 5,548,795 | A * | 8/1996 | Au | 710/52 |
| 5,621,897 | A * | 4/1997 | Boury et al. | 710/116 |
| 6,092,158 | A * | 7/2000 | Harriman et al. | 711/151 |
| 6,154,816 | A * | 11/2000 | Steely et al. | 711/150 |
| 6,643,718 | B1 * | 11/2003 | Chen et al. | 710/55 |
| 7,136,938 | B2 * | 11/2006 | Clark et al. | 710/6 |
| 7,254,654 | B1 * | 8/2007 | Davis et al. | 710/52 |
| 7,359,994 | B1 * | 4/2008 | Lakhanpal et al. | 710/5 |
| 2004/0078507 | A1 * | 4/2004 | Bogin et al. | 710/310 |
| 2006/0047904 | A1 * | 3/2006 | Rohde et al. | 711/114 |
| 2007/0174493 | A1 * | 7/2007 | Irish et al. | 710/5 |

OTHER PUBLICATIONS

D. Abadi, D. Carney, M. Cherniack; Aurora: A Data Stream Management System; Jun. 2003, ACM, pp. 1.*
Andreas Moshovos and Gurindar S. Soshi; Streamlining Inter-operation Memory Communication via Data Dependence Prediction; 1997; IEEE; pp. 1-11.*
Levent Gurgen, Claudia Roncancio, Cyril Labbe, Vincent Olive; Transactional Issues in Sensor Data Management, 2006, ACM, 3rd Int'l Workshop on DMSN, pp. 1-6.*

* cited by examiner

*Primary Examiner*—Tariq Hafiz
*Assistant Examiner*—Elias Mamo
(74) *Attorney, Agent, or Firm*—Joan Pennington

(57) ABSTRACT

A method and apparatus are provided for managing dependencies between split command and data transactions. A command transaction is written into a command array. A data transaction is written into a data array. A marker is defined for both command transactions and data transactions, and a marked command counter is maintained. Marked data will not be sent unless the older commands have been sent. A data header is marked if the previous transaction written was a command, and a command is marked if the previous transaction written was data. The marked command counter maintains a count of marked commands sent relative to sending marked data.

3 Claims, 5 Drawing Sheets

MARKED COMMAND COUNTER
300

| MARKED COMMAND SENT | MARKED DATA SENT | EFFECT ON THE COUNT |
|---|---|---|
| 0 | 0 | NONE |
| 0 | 1 | DECREMENT |
| 1 | 0 | INCREMENT |
| 1 | 1 | NONE |

FIG. 3

METHOD AND APPARATUS FOR MANAGING DEPENDENCIES BETWEEN SPLIT TRANSACTION QUEUES

FIELD OF THE INVENTION

The present invention relates generally to the data processing field, and more particularly, relates to a method and apparatus for managing dependencies between split command and data transactions.

DESCRIPTION OF THE RELATED ART

An interface including split command and data transactions queues must split time between sending command information and data information. Since the information is of two different types, the receiving unit may split the incoming traffic into separate command and data queues. However, the information in the data queue may have a dependency on the information in the command queue. Determining when data can be released from the data queue can be difficult, for example, as required for a cache-coherent bus structure.

For example, consider an example fetch command transaction as follows:

Device A-->Fetch command Y-->Device B

Device A--<Fetch response Y--<Device B

Device A--<Fetch data Y--<Device B

By definition of the link interface, the fetch response is sent as sub-portion of a command packet. Now consider when the incoming traffic to device A is composed of mostly command transactions prior to the receipt of fetch response Y, followed by fetch data Y. Device A's command queue may be nearly full, and may take a while to empty. Meanwhile, the data queue may be empty. But device A must not process the fetch data until it has extracted the response for it, or an error may occur. A need exists for an effective mechanism to determine when the data can be released.

SUMMARY OF THE INVENTION

Principal aspects of the present invention are to provide a method and apparatus for managing dependencies between split command and data transactions. Other important aspects of the present invention are to provide such method and apparatus for managing dependencies between split command and data transactions substantially without negative effect and that overcome many of the disadvantages of prior art arrangements.

In brief, a method and apparatus are provided for managing dependencies between split command and data transactions. A command transaction is written into a command array. A data transaction is written into a data array. A marker is defined for both command transactions and data transactions, and a marked command counter is maintained. A data header is marked if the previous transaction written was a command, and a command is marked if the previous transaction written was data. Marked data will not be sent unless the older commands have been sent. The marked command counter maintains a count of marked commands sent relative to sending marked data.

In accordance with features of the invention, this marking defined for both command transactions and data transactions provides a one to one correspondence between strings of commands and strings of data transactions, with the first item in each string being marked. This change does not impede the sending of commands or unmarked data, but adds the condition, which causes marked data to wait until the older commands have been sent.

In accordance with features of the invention, older commands have been sent if either the command array is empty, or the marked command older than the marked data of interest has been sent. Since several marked commands could be sent before the marked command after the marked data of interest, this is tracked with the marked command counter.

In accordance with features of the invention, the count in the marked command counter is incremented when a marked command is sent. The count in the marked command counter is decremented when a marked data is sent. A marked data packet is not allowed to be sent unless the counter value is greater than zero or the command array is empty.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, 3, 4, and 5 illustrates exemplary operations of the chip interface apparatus of FIG. 1 for managing dependencies between split command and data transaction queues in accordance with the preferred embodiment.

DETAILED DESCRIPTION OF THE PREFERRED EMBODIMENTS

In accordance with features of the invention, a method is provided for managing dependencies between split command and data transaction queues. While response packets and data packets traveling over a link are split off into different queues, the ordering between combined responses and data is maintained in order for the transaction to complete correctly. Commands and Responses are merged into the same packet when going over the link, and have their own queue when received by another chip. Data travels in data packets, and goes into a data queue when received by another chip.

Physically there are two links between chips, but the traffic looks like this:

Store (unit on chip A makes request, unit on chip B responds, chip A has master command broadcast point):

```
Chip A -----broadcast request----> chip B
        <----response----
        -----combined response--->
        -----data-------->
```

Fetch (unit on chip B makes request, unit on chip A responds, chip A has master command broadcast point):

```
Chip A <-----request---- chip B
   --broadcast request--->
   <--response------ (null response - correct responder on chip A)
   --combined response--->
   ----data-------->
```

In accordance with features of the method of the invention, for stores, the combined response stays ahead of the store data after it has crossed the link. For fetches, the combined response stays ahead of the fetch data after it has crossed the link.

Figure 1:
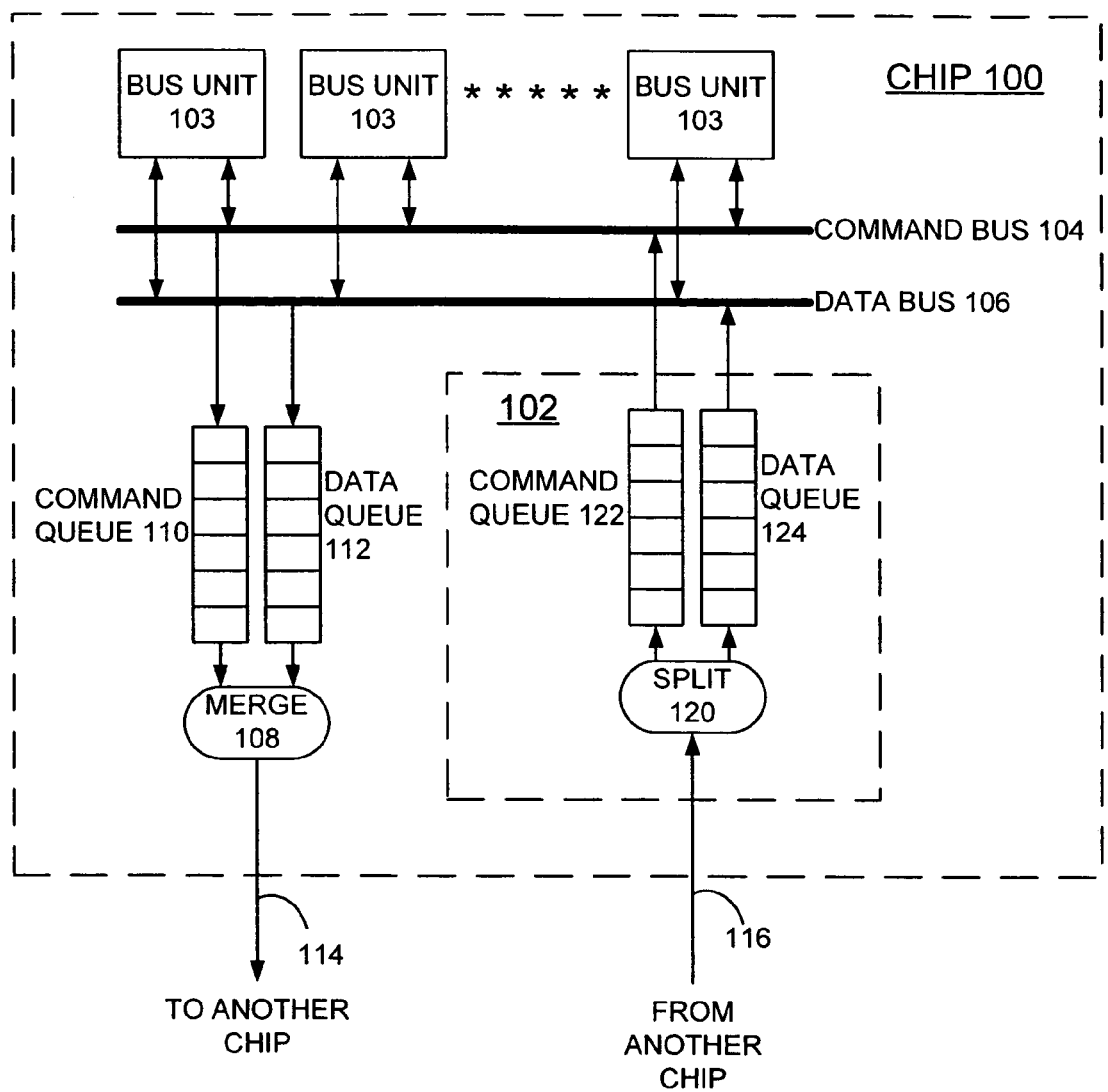
FIG. 1 is a schematic diagram representation illustrating a chip including interface apparatus for implementing methods for managing dependencies between split command and data transaction queues in accordance with the preferred embodiment.

Having reference now to the drawings, in FIG. 1, there is shown a chip generally designated by the reference character 100 including interface apparatus 102 for implementing methods for managing dependencies between split command and data transaction queues in accordance with the preferred embodiment.

Chip 100 includes a plurality of bus units 103. Each bus unit 103 is connected to a command bus 104, and a data bus 106. A merge function 108, respectively coupled to the command bus 104 and the data bus 106 by a command queue 110 and a data queue 112, sends transactions to another chip (not shown) across a link indicated by a line labeled 114. Chip 100 receives transactions from another chip across a link indicated by a line labeled 116.

Chip interface system 100 includes apparatus 102, generally indicated within a dotted line, for implementing methods for managing dependencies between split command and data transaction queues in accordance with the preferred embodiment. Command and response packets, and data packets are each handled separately, or split, while ordering between combined responses and data is maintained as required, such as, for a cache-coherent bus structure.

Transactions come off the link 116, and are identified as either command or data transactions by a split function 120. Command transactions are written into a command array 122, and data transactions are written into a data array 124. Each of the arrays 122, 124 serves a respective asynchronous crossing converter, which converts the transactions from the clock domain of the link 116 to the internal clock domain of the chip 100.

In accordance with features of the invention, a marker is defined for both commands and data, and a command counter is maintained. As transactions are written into the asynchronous crossing arrays 122, 124, a data header is marked if the previous transaction was a command, and a command is marked if the previous transaction was data. Now there is a one to one correspondence between strings of commands and strings of data transactions, with the first item in the string marked. This change does not impede the sending of commands or unmarked data, but adds a condition, which causes marked data to wait. Marked data will not be sent unless the older commands have been sent. Older commands have been sent if either the command array is empty, or the marked command older than the data has been sent. Since several marked commands could be sent before the marked command after the marked data of interest, this is tracked with a counter, for example, as illustrated and described with respect to FIG. 3.

It should be understood that merge function or control block 108 maintains order between commands/responses and data such that commands/responses which arrive at the input to queue 110 with or before a given data transaction arrives at the input to queue 112 are placed on link 114 before the data transaction is placed on link 114.

Figure 2:
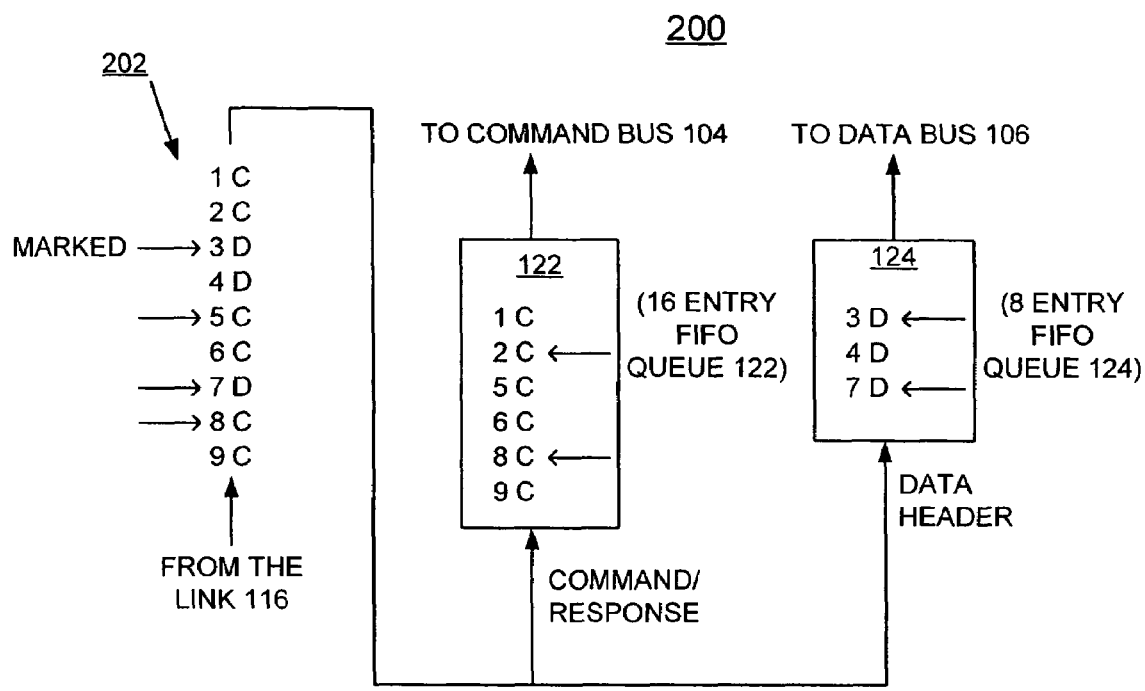

Referring now to FIGS. 2 and 3, there are shown exemplary operations respectively generally designated by the reference character 200, and 300 of the chip interface apparatus 102 for managing dependencies between split command and data transaction queues in accordance with the preferred embodiment.

In FIG. 2, a reference character 202 generally designates an exemplary representation of a group of packets received from the link 116. The packets 202 or physical layer groups (PLGs) received from the link 116 are sequentially numbered from 1 to 9, C represents a command, and D represents data or a cache line. An arrow indicates the command packets 5C, 8C and data packets 3D, 7D that are marked. These same PLGs or group of packets 202 are shown in the command/response array 122 and the data header array 124.

As shown in FIG. 2, the fix for the functional error requires that data packet 3D not be sent if command packet 5C is still in the command array 122. Similarly, data packet 7D would not be sent if command packet C8 remains in the command array 122.

Referring also to FIG. 3, there are shown exemplary operations of a marked command counter 300 in accordance with the preferred embodiment. The marked command counter 300 indicates how many marked commands have been sent ahead of the data that is next to send. The marked command counter 300 is in the clock domain of chip 100.

Marked command counter 300 is initialized to 0, incremented when a marked command is sent, and decremented when a request to send marked data occurs. A marked data packet in data queue 124 is not allowed to be sent unless the counter value is greater than zero or the command array is empty in accordance with the preferred embodiment.

In the illustrated embodiment, the maximum value in the marked command counter 300 is 8. At most there could be 8 entries in the data array 124 in the illustrated embodiment. There is a one to one correspondence between marked data and marked commands. So 8 marked commands could be sent while the data is held in the array 124. A 9th command could not have entered the command array 122, since it followed the 9th data entry, which would not fit in the data array.

In the illustrated embodiment, the minimum value in the marked command counter 300 is −2 (negative two). Starting with an initial count of 0, marked data could be written to the array 124 and sent out, if the command array 122 was empty. This would make the count negative 1. After a pause, a marked command and marked data could be written. Due to the asynchronous nature of the interface apparatus 102, the marked data could be seen in the link clock domain while the command array 122 looked empty. A request to send this data would decrement the count to negative 2 in the marked command counter 300. If it is advantageous to avoid a count of −2, then "command array empty" with a count of 0 could further be qualified as a condition for sending marked data.

Figure 4:
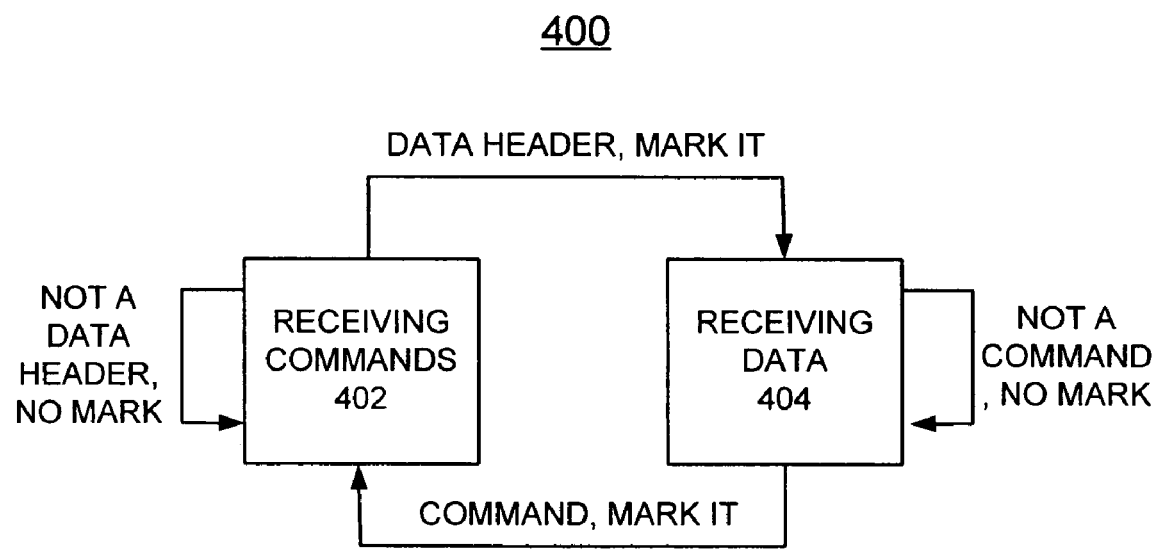

In accordance with features of the invention, a finite state machine in the link clock domain controls the marking of commands and data, for example, as illustrated and described with respect to FIG. 4.

Referring now to FIG. 4, there is shown a state transition diagram generally designated by the reference character 400 for managing dependencies between split command and data transaction queues in accordance with the preferred embodiment. FIG. 4 illustrates a state 402 for receiving commands from the link 116 and a state 404 for receiving data.

When receiving commands at state 402, commands are written to the array 122 unmarked and no state transition occurs. When receiving commands at state 402, data is marked and written to the array 124, and a transition to the receiving data state 404 occurs. The receiving data state 404 is similar to receiving commands state 402, In receiving data state 404, data is written unmarked and commands are marked and cause a state transition to the receiving commands state 402. The initial state should be receiving commands state 402, to avoid marking any commands until the first data is seen. This is a conceptual description sufficient for understanding the present invention, and details involving type A and type B transfers, and saving and restoring the state values when there is a retry are not required for understanding the present invention.

Figure 5:
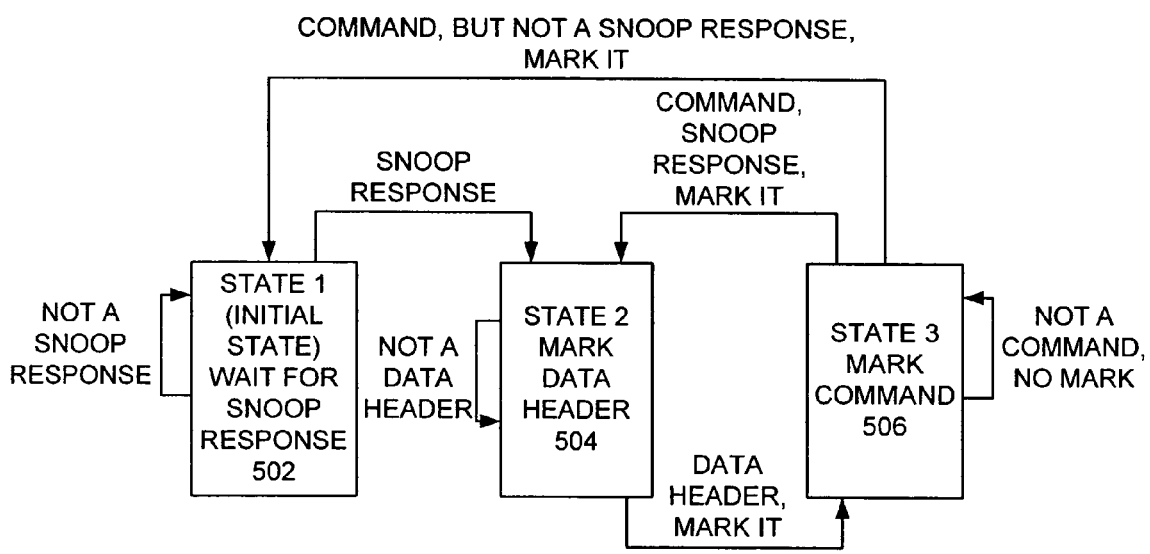

Referring now to FIG. 5, there is shown another exemplary state transition diagram generally designated by the reference character 500 for managing dependencies between split command and data transaction queues in accordance with the preferred embodiment. The state sequence diagram 500 avoids marking data unless there was a snoop response preceding the data, and provides a performance improvement. FIG. 5 illustrates a first state 1, 502 to wait for a snoop response in the initial state 502, a second state 2, 504 to mark data headers and a third state 3, 506 to mark command headers.

The initial state of the state machine is State 1, "Wait for Snoop Response" 502. No headers are marked when in this state 502. If a command header containing a Snoop response occurs, the state transitions to state 2, "Mark Data Header" 504. It remains in this state 504 until a data header occurs, upon which it marks the data header and transitions to state 3, "Mark command" 506. It remains in state 3, 506 until a command header occurs. The command header is marked, and if the command header contains a snoop response, it transitions to state 2, 504. If no snoop response was present in the command, it transitions to state 1, 502. Operation continues from there based on the received order of command headers with snoop responses and data headers.

While the present invention has been described with reference to the details of the embodiments of the invention shown in the drawing, these details are not intended to limit the scope of the invention as claimed in the appended claims.

What is claimed is:

1. A method for managing dependencies between split command and data transactions comprising the steps of:
    receiving command transactions from a split-transaction serial link and writing the command transactions into a command array;
    receiving data transactions from the split-transaction serial link and writing the data transactions into a data array;
    defining a marker for marking both command transactions and data transactions including,
        when in a state for receiving commands, receiving a command, and writing the command into the command array unmarked; and receiving a data header, marking the data header and writing the data header into a data array and transitioning to a state for receiving data headers; said state for receiving commands being an initial state,
        when in said state for receiving data headers, receiving a data header, and writing the data header into a data array unmarked; and receiving a command, marking the command and writing the command into the command array, whereby a command is marked if the previous transaction written was a data header and transition to a state for receiving commands; and
    maintaining a marked command counter of each marked command sent to a command bus relative to sending marked data to a data bus including;
        providing a maximum counter value equal to a number of entries in the data array;
        providing an initial counter value of zero; and
        incrementing a count in the marked command counter with each marked command sent; and
    sending the marked data after each older command transaction has been sent.

2. A method for managing dependencies between split command and data transactions as recited in claim 1 wherein maintaining a marked command counter of each marked command sent relative to sending marked data includes decrementing the count in the marked command counter with each marked data sent.

3. A method for managing dependencies between split command and data transactions as recited in claim 1 wherein the marked data is not sent unless a counter value of the marked command counter is greater than zero or the command array is empty.

* * * * *